US006992820B2

(12) United States Patent
Abe et al.

(10) Patent No.: US 6,992,820 B2
(45) Date of Patent: Jan. 31, 2006

(54) ILLUMINATING OPTICAL SYSTEM AND MICROSCOPE PROVIDED WITH THE SAME

(75) Inventors: Katsuyuki Abe, Hachioji (JP); Keisuke Tamura, Hamburg (DE)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/185,742

(22) Filed: Jul. 1, 2002

(65) Prior Publication Data

US 2004/0001253 A1 Jan. 1, 2004

(51) Int. Cl.
*G02B 21/06* (2006.01)
*G02B 21/00* (2006.01)

(52) U.S. Cl. ................. 359/388; 359/368; 359/385
(58) Field of Classification Search ........ 359/368–390; 250/201.3, 216; 600/473, 476, 478; 351/200–247; 356/445–448
See application file for complete search history.

(56) References Cited

U.S. PATENT DOCUMENTS

| | | | | |
|---|---|---|---|---|
| 4,289,398 A | * | 9/1981 | Robichaud | 356/73.1 |
| 4,621,911 A | * | 11/1986 | Lanni et al. | 359/386 |
| 5,119,233 A | * | 6/1992 | Hayashi | 359/390 |
| 5,132,526 A | * | 7/1992 | Iwasaki | 250/201.3 |
| 5,258,787 A | * | 11/1993 | Ito et al. | 351/214 |
| 5,404,238 A | * | 4/1995 | Dreessen et al. | 359/385 |
| 5,570,228 A | * | 10/1996 | Greenberg | 359/389 |
| 5,677,525 A | * | 10/1997 | Volcker et al. | 250/201.3 |
| 5,748,367 A | * | 5/1998 | Lucke et al. | 359/385 |
| 5,801,881 A | * | 9/1998 | Lanni et al. | 359/386 |
| 5,939,709 A | * | 8/1999 | Ghislain et al. | 250/216 |
| 6,094,300 A | * | 7/2000 | Kashima et al. | 359/385 |
| 6,181,478 B1 | * | 1/2001 | Mandella | 359/642 |
| 6,195,203 B1 | * | 2/2001 | Kadogawa | 359/385 |
| 6,370,422 B1 | | 4/2002 | Richards-Kortum et al. | 600/478 |
| 6,462,814 B1 | * | 10/2002 | Lo | 356/237.2 |
| 6,498,776 B1 | * | 12/2002 | Nakano et al. | 369/112.23 |
| 6,819,484 B2 | * | 11/2004 | Aono et al. | 359/368 |

* cited by examiner

*Primary Examiner*—Thong Q Nguyen
(74) *Attorney, Agent, or Firm*—Pillsbury Winthrop Shaw Pittman LLP

(57) ABSTRACT

A microscope of the present invention causes laser light emanating from a light source to enter an optical fiber via a laser light introducing mechanism. The exit end of the optical fiber is connected with an adapter having a fiber position adjustment knob. The back focal position of an objective lens and the exit end position of the optical fiber are made conjugate by a condenser lens provided inside a reflecting illumination projecting tube. By shifting the exit end position of the optical fiber, conventional reflecting illumination and evanescent illumination are available.

7 Claims, 9 Drawing Sheets

ILLUMINATING OPTICAL SYSTEM AND MICROSCOPE PROVIDED WITH THE SAME

BACKGROUND OF THE INVENTION

1. Field of the Invention

The present invention relates to a microscope, specifically to an illuminating optical system that illuminates a sample using total reflection, and a fluorescence microscope provided with the same illuminating optical system. Also, the present invention relates to a microscope to which both of the conventional illumination using a reflecting illuminating optical system and the illumination using total reflection are applicable.

2. Description of Related Art

In recent years, in biological study, illumination method using total reflection (hereafter, referred to "evanescent illumination") has been often employed for exciting fluorescent dye. The reason is as follows. According to this method, since the illumination range is extremely shallow in the depth direction of the sample, information on the surface and its vicinity of the sample is obtained at high sensitivity as being little affected by the background.

Comparison between the conventional reflecting illuminating optical system and the evanescent illumination is made as follows. As shown in FIG. 1, under the conventional reflecting illumination, illumination light is incident on a sample (not shown) on a cover glass via an objective lens along an optical axis. In this situation, illumination intensity is highest in the vicinity of the focal position of the objective lens and decreases as the position is away from the focal position. In this way, the illumination light has intensity distribution such that intensity varies in the depth direction of the sample. However, since the light has substantial intensity in a certain range, most of fluorescent dyes residing in the depth direction corresponding to this range are excited. Therefore, fluorescence emission other than from the surface in focus of the objective lens is observed as background light, to degrade S/N ratio.

On the other hand, as shown in FIG. 2, under the evanescent illumination, illumination light is incident on a sample via an objective lens, in an oblique direction in reference to an optical axis. In this situation, the irradiation angle is preset so that total reflection occurs at the interface between the cover glass and the sample. It is noted that not all the illumination light is reflected at the interface, but a very small part of the light oozes toward the sample side through the cover glass. The oozing light from the interface is evanescent light and reaches, in the depth direction of the sample, a distance equivalent to the wavelength of the light source in use. In this way, in the case where the evanescent light is used as illumination light, since the illumination range is limited to the depth equivalent to the wavelength of the light source in use, the region that emits fluorescence is very narrow while the remaining regions emitting no fluorescence, and accordingly the background fluorescence is very small, which is different from the case where the ordinary reflecting illumination is adopted. Therefore, evanescent illumination can achieve extremely high S/N ratio, and thus is specifically effective for observation of a cell membrane surface and for visualization of a single molecule of fluorescent dye that is localized in the vicinity of the cover glass surface.

Japanese Patent Application Preliminary Publication (KOKAI) No. Hei 9-159922, Japanese Patent Application Preliminary Publication (KOKAI) No. Hei 11-211990, and "Noninvasive Techniques in Cell Biology", pp 93–127, Wiley-liss Inc. 1990, are known as disclosing the measures for embodying the evanescent illumination.

However, although the configuration disclosed in the above-mentioned prior art realizes evanescent illumination, laser light as the illumination light (exciting light) is designed to be introduced to a microscope via optical elements such as a reflecting mirror disposed between the laser light source and the microscope. Such a configuration requires adjustment of the optical elements, and, in addition, a cover for shielding the optical elements from dust, to render the apparatus bulky. Also, layout flexibility of the laser light source and the microscope is poor.

Also, in order to carry out the evanescent illumination, the irradiation angle of the illumination light on the sample is important. It is necessary to set the angle such that total reflection occurs. However, since the total reflection phenomenon is susceptible to deviation from the angle that causes total reflection, even a slight error of the irradiation angle induces failure of total reflection. One of causes of the angular error is vibration applied from outside. When vibration is conducted to the laser light source, the microscope and the optical elements, these members vibrate. As a result, irradiation position and the irradiation angle are subtly changed to cause error. Therefore, it is necessary to arrange the laser light source and the microscope integrally on an anti-vibration pedestal. In addition, it is necessary to provide, in the path for introducing laser light from the laser light source through the microscope, optical systems such as a beam expander, which expands the beam diameter of the laser light, and a collector lens. Since these optical systems also have to be arranged on the same anti-vibration pedestal, the resulting entire system becomes bulky.

Also, "Noninvasive Techniques in Cell Biology" describes that evanescent illumination is achieved with a mercury lamp and a conical prism having an annular opening (axicon prism) inserted in the illumination path. Use of an axicon prism certainly allows light that emanates from a single spot of a mercury lamp to be annularly shaped. However, since the luminous region of an actual mercury lamp is greater than 0.5 mm, annular beams of rays overlap each other, to fail to be a single annular beam of rays. Therefore, in the case of this method, it is necessary to pick up only a beam of rays emanating from a single spot of the mercury lamp by using a plurality of stops. However, since most of light emanating from the mercury lamp is cut off at the stops, the illumination intensity would be lowered.

SUMMARY OF THE INVENTION

Therefore, an object of the present invention is to provide an illuminating optical system that uses laser light having sufficient intensity to excite fluorescent dye and that is easily switchable between evanescent illumination and ordinary reflecting illumination, while forming a compact entire system, and a microscope provided with this illuminating optical system.

In order to attain the object, an illuminating optical system according to the present invention includes a laser light source, an introducing optical system which introduces light emanating from the laser light source to an optical fiber, and an irradiating optical system which irradiates a sample with light emanating from the optical fiber. The irradiating optical system includes a first collecting optical system disposed on the sample side and a second collecting optical system disposed on the optical-fiber side. The second collecting optical system collects the light emanating from the optical fiber on a back focal point of the first collecting optical system or the vicinity thereof. The illuminating optical system is provided with a moving mechanism which moves the optical fiber in a plane perpendicular to an optical axis of the irradiating optical system.

Also, a microscope according to the present invention includes a laser light source, an introducing optical system which introduces light emanating from the laser light source into an optical fiber, and an irradiating optical system which irradiates a sample with light emanating from the optical fiber. The irradiating optical system includes a first collecting optical system disposed on the sample side and a second collecting optical system disposed on the optical-fiber side. The second collecting optical system collects the light emanating from the optical fiber on a back focal point of the first collecting optical system or the vicinity thereof. The microscope is provided with a moving mechanism which moves the optical fiber in a plane perpendicular to an optical axis of the irradiating optical system. The microscope is provided with a first illumination mode where the optical fiber is positioned on the optical axis of the irradiating optical system and a second illumination mode where the optical fiber is positioned separated from the optical axis of the irradiating optical system.

This and other objects as well as features and advantages of the present invention will become apparent from the following description of the preferred embodiments when taken in conjunction with the accompanying drawings.

DETAILED DESCRIPTION OF THE PREFERRED EMBODIMENTS

Hereafter, modes for carrying out the present invention are explained in reference to the drawings.

First Embodiment

Figure 1:
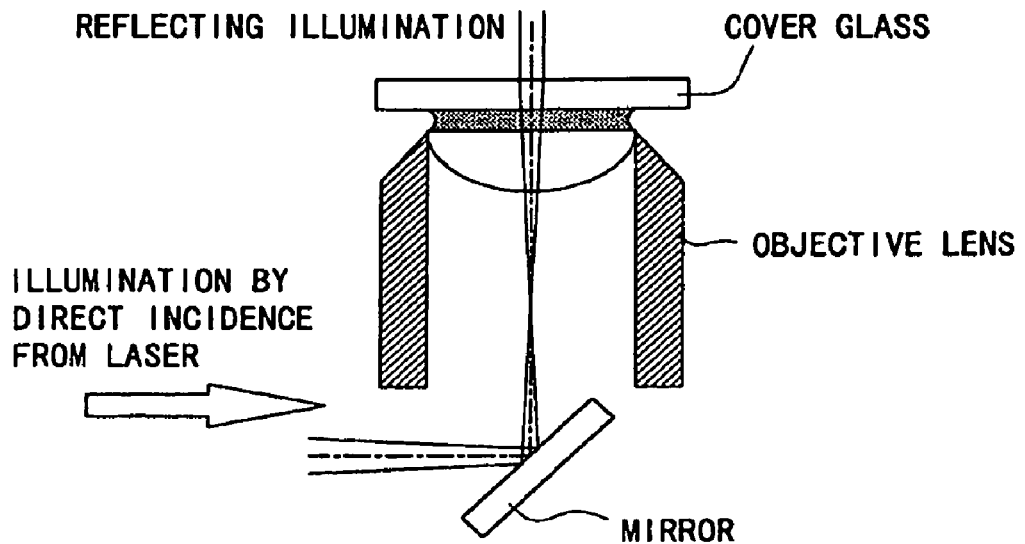
FIG. 1 shows the conventional reflecting illumination.
Figure 2:
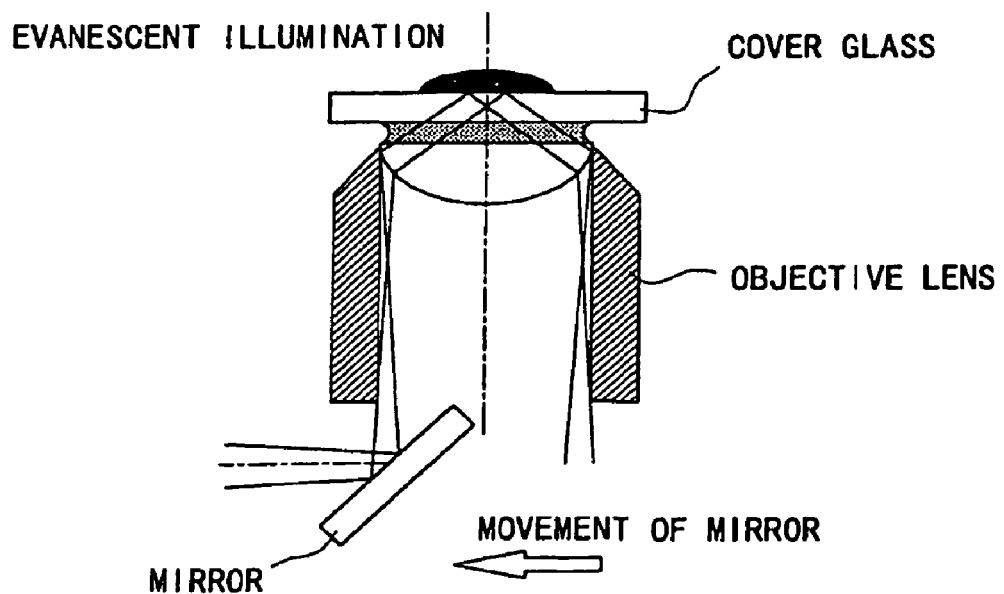
FIG. 2 shows evanescent illumination.
Figure 3:
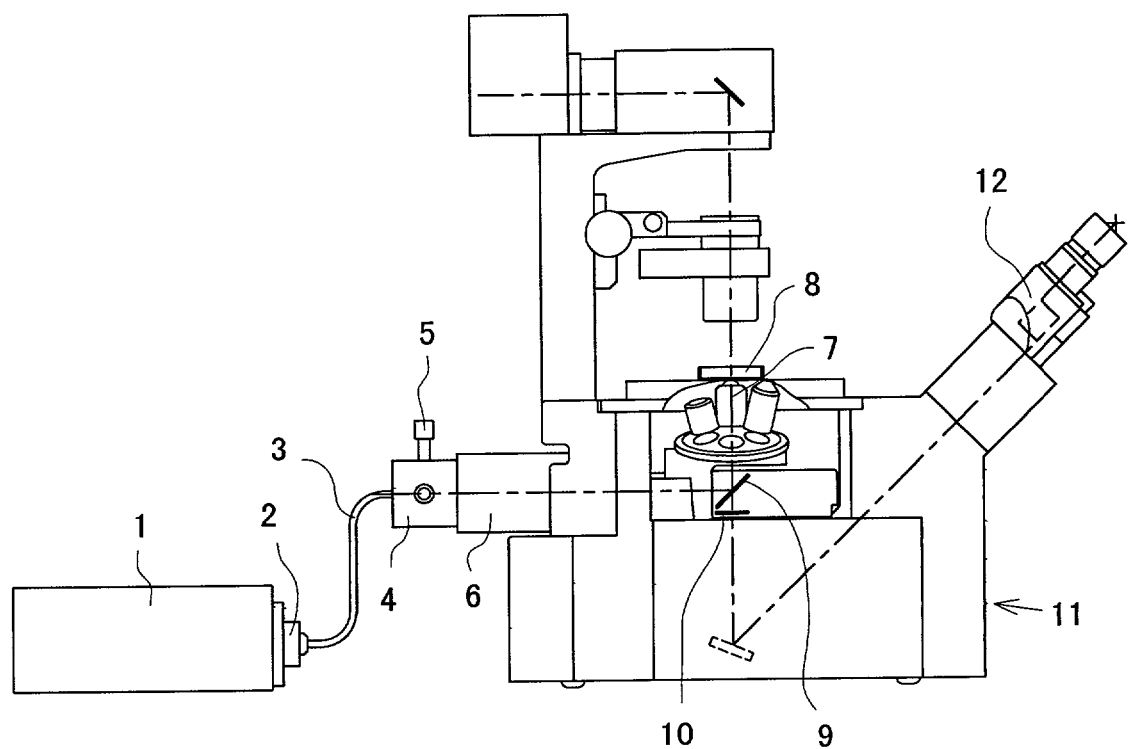
FIG. 3 shows the configuration of an inverted fluorescence microscope provided with an illuminating optical system according to the first embodiment of the present invention.

The first embodiment is shown in FIG. 3 through FIG. 6. FIG. 3 shows an inverted fluorescence microscope provided with an illuminating optical system according to the present invention. In FIG. 3, the reference numeral 1 represents a light source, the reference numeral 2 represents a laser light introducing mechanism, the reference numeral 3 represents an optical fiber, the reference numeral 4 represents an adapter, the reference numeral 5 represents a fiber position adjustment knob, the reference numeral 6 represents a reflecting illumination projecting tube, the reference numeral 7 represents an objective lens, the reference numeral 8 represents a sample, the reference numeral 9 represents a dichroic mirror, the reference numeral 10 represents an absorption filter, the reference numeral 11 represents a microscope body, and the reference numeral 12 represents an observation tube.

Figure 4:
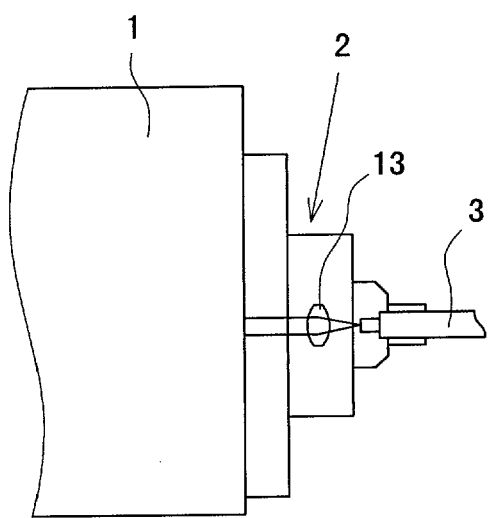
FIG. 4 shows a laser light introducing mechanism.

The light source 1 is a laser light source. Laser light emanating from the light source 1 is introduced into the optical fiber 3 via the laser light introducing mechanism 2. As shown in FIG. 4, the laser light introducing mechanism 2 has an introducing optical system composed of a lens 13, so as to collect a laser beam of substantially parallel rays emanating from the light source 1 on an entrance end face of the optical fiber 3. A beam diameter converting optical system, which expands or reduces the beam diameter of the laser light, may be arranged on the light source side of the lens 13 in accordance with the core diameter of the optical fiber 3. In this case, the introducing optical system should be composed of the lens 13 and the beam diameter converting optical system. Also, it is desirable that the numerical aperture determined by the beam of rays collected by the lens 13 is smaller than the numerical aperture of the optical fiber 3.

Laser light entering the optical fiber 3 reaches the exit end as propagating through the optical fiber 3. The exit end of the optical fiber 3 is connected with the adapter 4. The adapter 4 is connected with the reflecting illumination projecting tube 6 so as to introduce the laser light emanating from the optical fiber 3 into the reflecting illumination projecting tube 6. A known adjustment mechanism is provided in the adapter 4, by which the exit end of the optical fiber 3 is held. The known adjustment mechanism allows the optical fiber 3 to be moved in a direction of the optical axis and in a plane perpendicular to the optical axis, and, in addition, to be adjusted regarding tilt in reference to the optical axis. The adjustment mechanism is provided with the fiber position adjustment knob 5 so that the exit end position of the optical fiber 3 is adjustable from outside by operating the fiber position adjustment knob 5.

The laser light emanating from the optical fiber 3 passes through the reflecting illumination projecting tube 6 and is incident on the dichroic mirror 9. The laser light is reflected by the dichroic mirror 9 toward the objective lens 7 and is incident on the sample 8 via the objective lens 7. Fluorescence emitted from the sample 8 reaches the observation tube 12 via the objective lens 7, the dichroic mirror 9, and the absorption filter 10.

Figure 5:
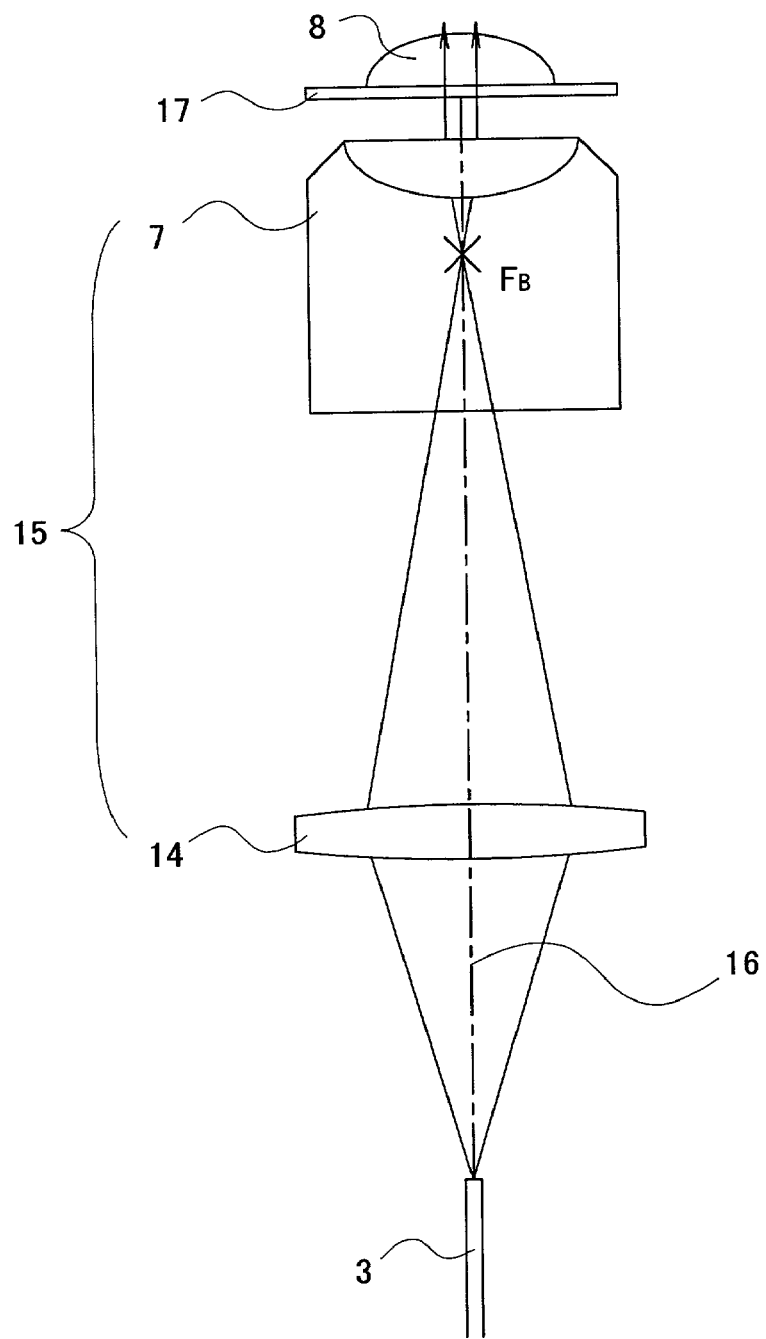
FIG. 5 shows the main section of the illuminating optical system according to the first embodiment, where it is in the Koehler illumination mode.
Figure 6:
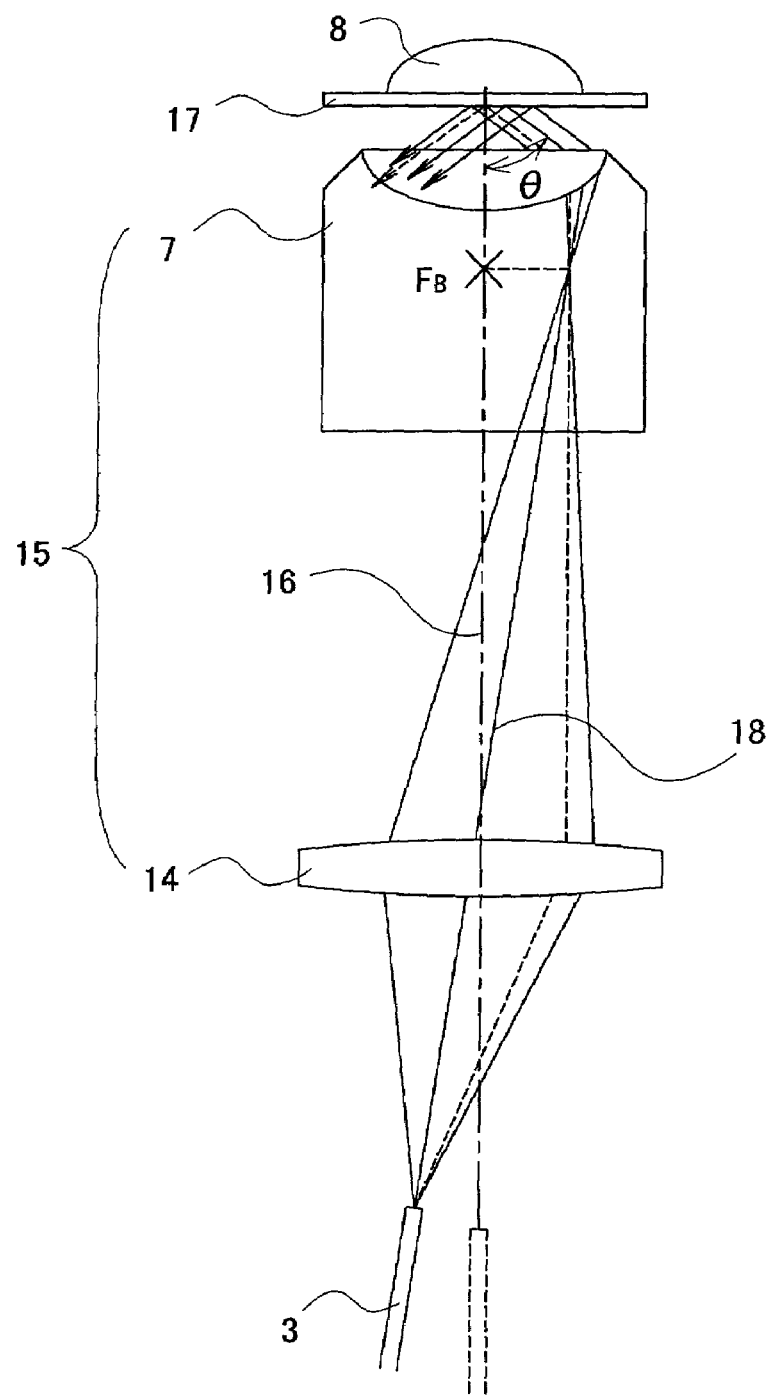
FIG. 6 shows the main section of the illuminating optical system according to the first embodiment, where it is in the evanescent illumination mode.

FIGS. 5 and 6 show the main section of the illuminating optical system provided inside the reflecting illumination projecting tube 6, or an irradiating optical system 15 which irradiates the sample 8 with the laser light emanating from the optical fiber 3. The irradiating optical system 15 includes an objective lens 7 (first collecting optical system) disposed on the sample side and a collector lens 14 (second collecting optical system). FIG. 5 shows the optical configuration where the conventional reflecting illumination (Koehler illumination) is carried out. FIG. 6 shows the optical configuration where evanescent illumination is carried out. In each drawing, the dichroic mirror 9 is omitted for simplicity, and the optical fiber 3 through the objective lens 7 are illustrated in a linear arrangement.

Under the conventional reflecting illumination (the first path of rays) shown in FIG. 3, the exit end of the optical fiber 3 is positioned on the optical axis 16 of the irradiating optical system 15. Also, the collecting lens 14 is arranged in such a manner that the back focal point FB of the objective lens 7 and the exit end of the optical fiber 3 are conjugate. Consequently, laser light emanating from the optical fiber 3 once converges on the back focal point FB of the objective lens 7 and then is incident on the objective lens 7. As a result, the laser beam emanating from the objective lens 7 becomes a beam of parallel rays and the sample 8 is illuminated in the Koehler illumination mode.

On the other hand, in the case where the evanescent illumination (second path of rays) is carried out, the exit end face of the optical fiber 3 is shifted from the position on the optical axis 16 (the conventional illumination position illustrated with broken lines) to a position out of the optical axis 16, as shown in FIG. 6. According to this embodiment, the exit end of the optical fiber 3 is moved in such a manner that the projected image of the exit end of the optical fiber 3 moves in a plane perpendicular to the optical axis 16 at the back focal position FB of the objective lens 7 (hereafter, referred to "back focal plane of the objective lens 7"). In this situation, the arrangement in that the center ray 18 (a ray traveling straight from the optical fiber 3 without diverging) obliquely meets the back focal plane as a chief ray could facilitate efficient use of the illumination light and thus is preferable.

Also, it is preferable that the orientation of the exit end face of the optical fiber 3 is changed in accordance with shift of the exit end of the optical fiber 3. Also, the optical fiber 3 may be moved in such a manner that movement locus of the exit end of the optical fiber 3 draws an arc. Although FIG. 5 illustrates that the position of the optical fiber 3 in the evanescent illumination mode is greatly displaced toward the side of the collector lens 14 from the position of the optical fiber 3 in the conventional reflecting illumination mode, this is made for the purpose of emphasizing a difference between the conventional reflecting illumination and the evanescent illumination. The amount of displacement is small in reality. The exit end face of the optical fiber 3 is moved by operation of the fiber position adjustment knob 5. Although only one adjustment knob 5 is shown in FIG. 3, adjustment may be done upon a plurality of adjustment knobs being provided.

When the exit end of the optical fiber 3 on the optical axis is moved off the optical axis via operation of the fiber position adjustment knob 5, the angle of a beam of rays incident on the objective lens 7 is changed. Laser light emanating from the objective lens 7 is a beam of parallel rays as in the case of the conventional reflecting illumination, but is oblique with respect to the optical axis 16. The angle of the beam of rays emanating from the objective lens 7 varies with movement of the optical fiber 3.

As described above, the evanescent illumination utilizes total reflection. Here, if the angle θ of the beam of rays emanating from the objective lens 7 in reference to the optical axis 16 is smaller than $\sin^{-1}(n2/n1)$ where the refractive index of the cover glass 17 is n1 and the refractive index on the sample side is n2, the beam of rays emanating from the objective lens 7 is transmitted through the cover glass 17 and the sample 8. However, if the angle θ is equal to (or greater than) $\sin^{-1}(n2/n1)$, total reflection occurs at the interface between the cover glass 17 and the sample 8 (or culture liquid or water for keeping the sample).

Therefore, most of the laser light could not reach the sample 8, but a very small part of the laser light reaches the side of the sample 8 across the interface between the cover glass 17 and the sample 8 (oozes toward the side of the sample 8). This light is evanescent light (evanescent field) and oozes toward the side of the sample 8 in the direction of the optical axis, to reach a distance equivalent to the wavelength of the illumination light. In this way, in the case of evanescent illumination, since the illumination range in the direction of the optical axis is very narrow, sample information (fluorescence) exclusively in the vicinity of the interface can be detected at high sensitivity.

The objective lens 7 of this embodiment is an immersion objective lens to be used with immersion oil filled in a space between the objective lens 7 and the cover glass 17, and has a numerical aperture of 1.4. The refractive index of the cover glass 17 is 1.52, and the refractive index of the immersion oil is 1.52. Therefore, refraction scarcely occurs at the interface between the cover glass 17 and the immersion oil.

As discussed above, according to this embodiment, since the configuration is made so that laser light emanating from the light source is introduced into the microscope via the optical fiber, the light source is allowed to be freely located in reference to the microscope. In this way, high flexibility of layout is assured. Also, in the conventional configuration where a reflecting mirror, a relay lens etc. are arranged between the light source and the microscope, we have to adjust the location and tilt of these optical elements for the purpose of introducing laser light into the microscope as watching the laser light. In contrast, the configuration as in this embodiment where an optical fiber is used does not require us to perform adjustment as watching laser light, and thus is an effective solution in view of safety. In addition, members such as a mechanism for supporting and adjusting these optical elements and a dust-proof member (cover) for keeping the optical elements from dust are not necessary, and accordingly the apparatus can be made compact. Also, since only one portion formed in the adapter is designed to be an adjustment member, adjustment can be easily made.

Second Embodiment

Figure 7:
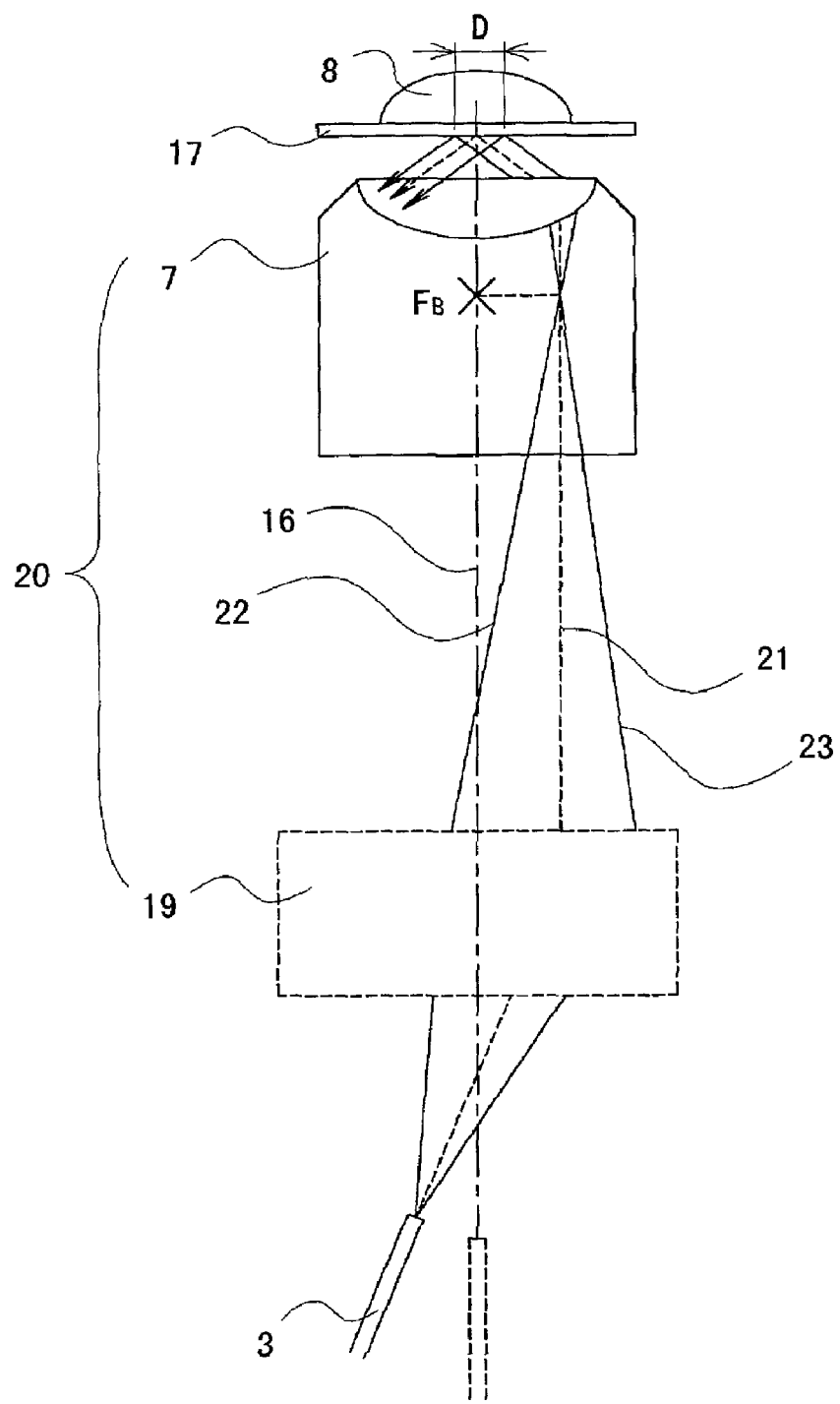
FIG. 7 shows the main section of the illuminating optical system according to the second embodiment of the present invention.

The second embodiment is shown in FIG. 7. FIG. 7 also shows the main section of the illuminating optical system provided inside the reflecting illumination projecting tube 6. The optical arrangement of the main section is different from the first embodiment. An irradiation optical system 20, which irradiates the sample 8 with laser light emanating from the optical fiber 3, is composed of the objective lens 7 disposed on the sample side and a collecting lens system 19 disposed on the side of the optical fiber 3. In this embodiment also, the dichroic mirror 9 is omitted in the drawing for simplicity, and the optical fiber 3 through the objective lens 7 are illustrated in a linear arrangement.

The collecting lens system 19 is composed of a plurality of lenses and is arranged in such a manner that the back focal point FB of the objective lens 7 and the exit end of the optical fiber 3 are conjugate. Therefore, when the optical fiber 3 is located at the position shown by the broken lines, the laser light emanating from the optical fiber 3 once converges on the back focal point FB of the objective lens 7 and then is incident on the objective lens 7, to emanate from the objective lens 7 as a laser beam parallel to the optical axis 16. As a result, Koehler illumination is achieved. On the other hand, in the case where the evanescent illumination is carried out, the exit end face of the optical fiber 3 is shifted to a position out of the optical axis 16, as illustrated with the solid lines.

According to this embodiment, the collecting lens system 19 is a one-side telecentric optical system that is telecentric to the side of the objective lens 7. Therefore, a center ray (chief ray) 21 out of the rays emanating from the optical fiber 3 is non-parallel to the optical axis 16 as it is incident on the collecting lens system 19, while it becomes parallel with the optical axis 16 as it emanates from the collecting lens system 19. Also, marginal rays 22, 23 out of the rays emanating from the optical fiber 3 become convergent rays as emanating from the collecting lens system 19, to intersect with each other at the back focal position FB of the objective lens.

As a result, the range (illumination range) D of a beam of rays incident on the interface between the cover glass 17 and the sample 8 forms a substantial circle. In this way, according to this embodiment, since all of the laser light emanating from the optical fiber 3 is utilized, illumination at high illumination efficiency can be achieved.

Third Embodiment

Figure 8:
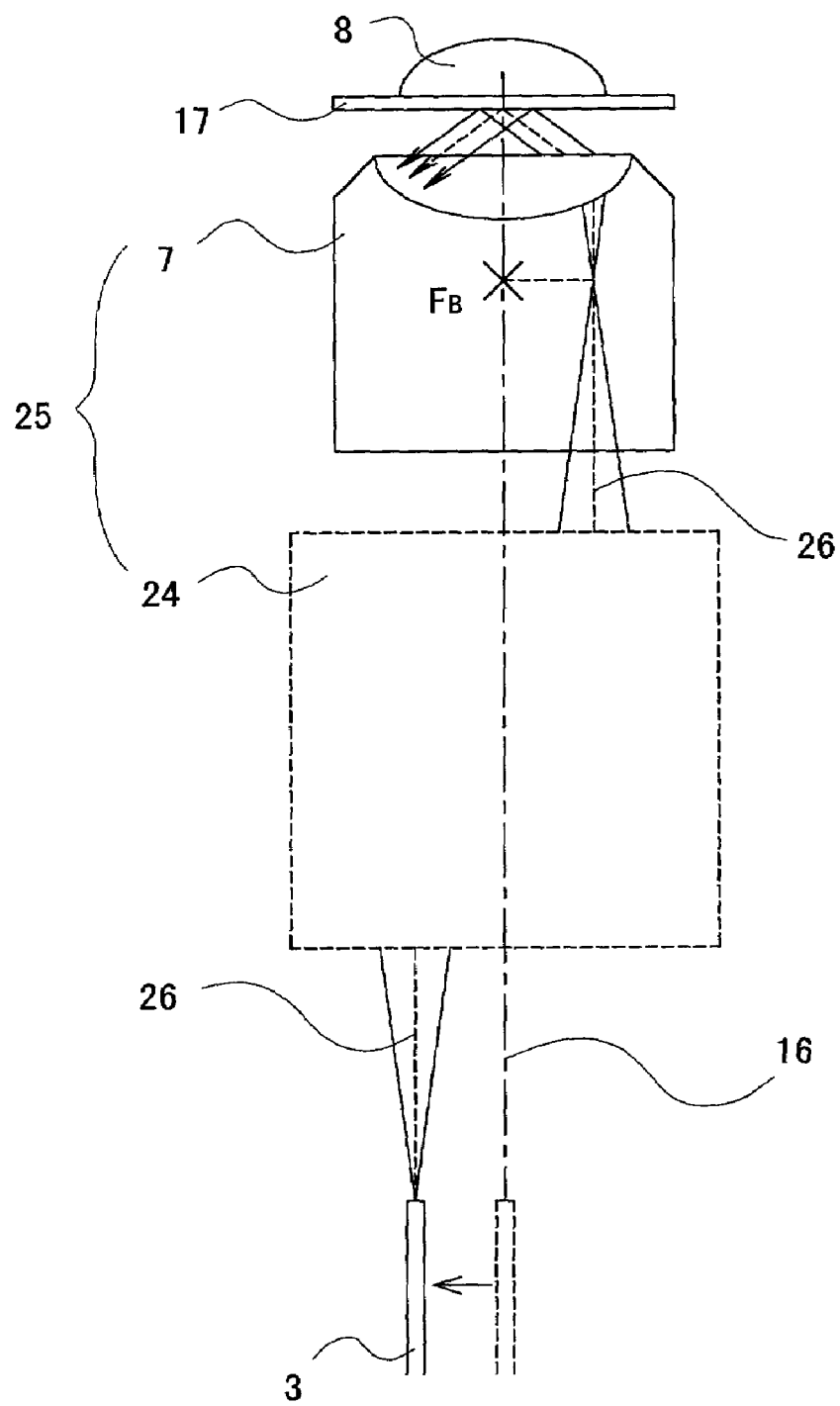
FIG. 8 shows the main section of the illuminating optical system according to the third embodiment of the present invention.

The third embodiment is shown in FIG. 8. FIG. 8 also shows the main section of the illuminating optical system provided inside the reflecting illumination projecting tube 6. An irradiation optical system, which irradiates the sample 8 with laser light emanating from the optical fiber 3, is composed of the objective lens 7 disposed on the sample side and a collecting lens system 24 disposed on the side of the optical fiber 3. In this embodiment also, the dichroic mirror 9 is omitted in the drawing for simplicity, and the optical fiber 3 through the objective lens 7 are illustrated in a linear arrangement.

As in the case of the second embodiment, the collecting lens system 24 is composed of a plurality of lenses and is arranged in such a manner that the back focal point FB of the objective lens 7 and the exit end of the optical fiber 3 are conjugate. Therefore, when the optical fiber 3 is located at the position shown by the broken lines, the laser light emanating from the optical fiber 3 once converges on the back focal point FB of the objective lens 7 and then is incident on the objective lens 7, to emanate from the objective lens 7 as a laser beam parallel to the optical axis 16. As a result, Koehler illumination is achieved. On the other hand, in the case where the evanescent illumination is carried out, the exit end face of the optical fiber 3 is shifted from the position on the optical axis 16 to a position out of the optical axis 16, as illustrated with the solid lines.

According to this embodiment, the collecting lens system 24 is a both-side telecentric optical system. Therefore, a center ray (chief ray) 26 out of the rays emanating from the optical fiber 3 is parallel to the optical axis 16 as it is incident on and as it emanates from the collecting lens system 24. Also, marginal rays out of the rays emanating from the optical fiber 3 become convergent rays as emanating from the collecting lens system 24, to intersect with each other at the back focal position FB of the objective lens.

As a result, as in the case of the second embodiment, the range (illumination range) D of a beam of rays incident on the interface between the cover glass 17 and the sample 8 forms a substantial circle. In this way, since all of the laser light emanating from the optical fiber 3 is utilized, illumination with high illumination efficiency can be achieved. Also, according to this embodiment, the optical fiber is only required to move in a plane perpendicular to the optical axis. In the movement, the exit end face of the optical fiber 3 need not be tilted in reference to the optical axis. Therefore, the adjustment mechanism, which adjusts the position of the optical fiber, is allowed to be simpler than in the case of the first or second embodiment, and accordingly the operability is improved.

Figure 9:
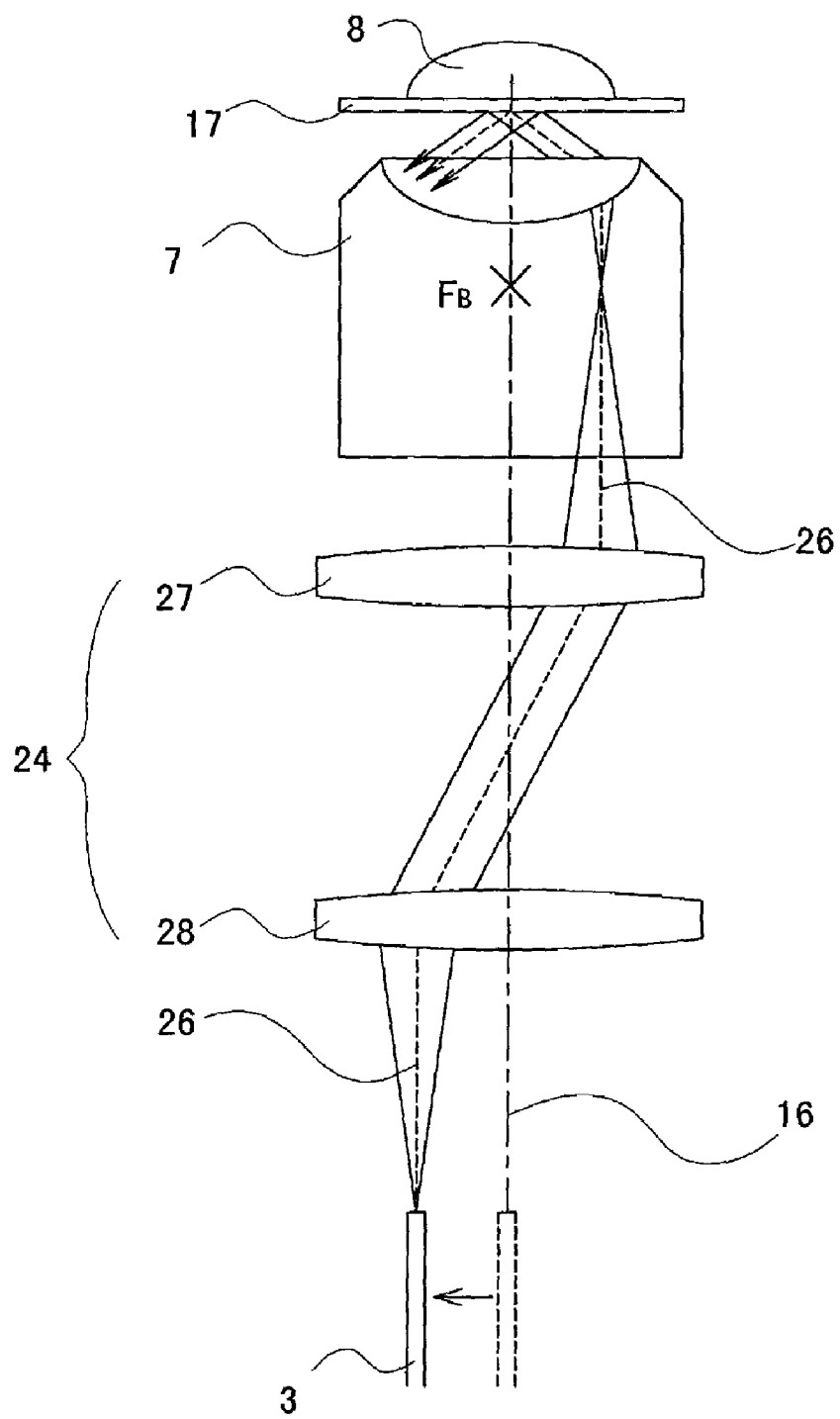
FIG. 9 shows a specific lens configuration example in the main section of the illuminating optical system according to the third embodiment.

FIG. 9 shows a specific example of the collecting lens system 24. Two positive lenses 27, 28 form the collecting lens system 24. The exit end of the optical fiber 3 is arranged on the front focal plane of the positive lens 27, and the back focal plane of the positive lens 28 coincides with the back focal point FB of the objective lens 7. The configuration of FIG. 9 forms a collecting lens system made of two lenses, and thus is an effective solution in view of cost.

Fourth Embodiment

Figure 10:
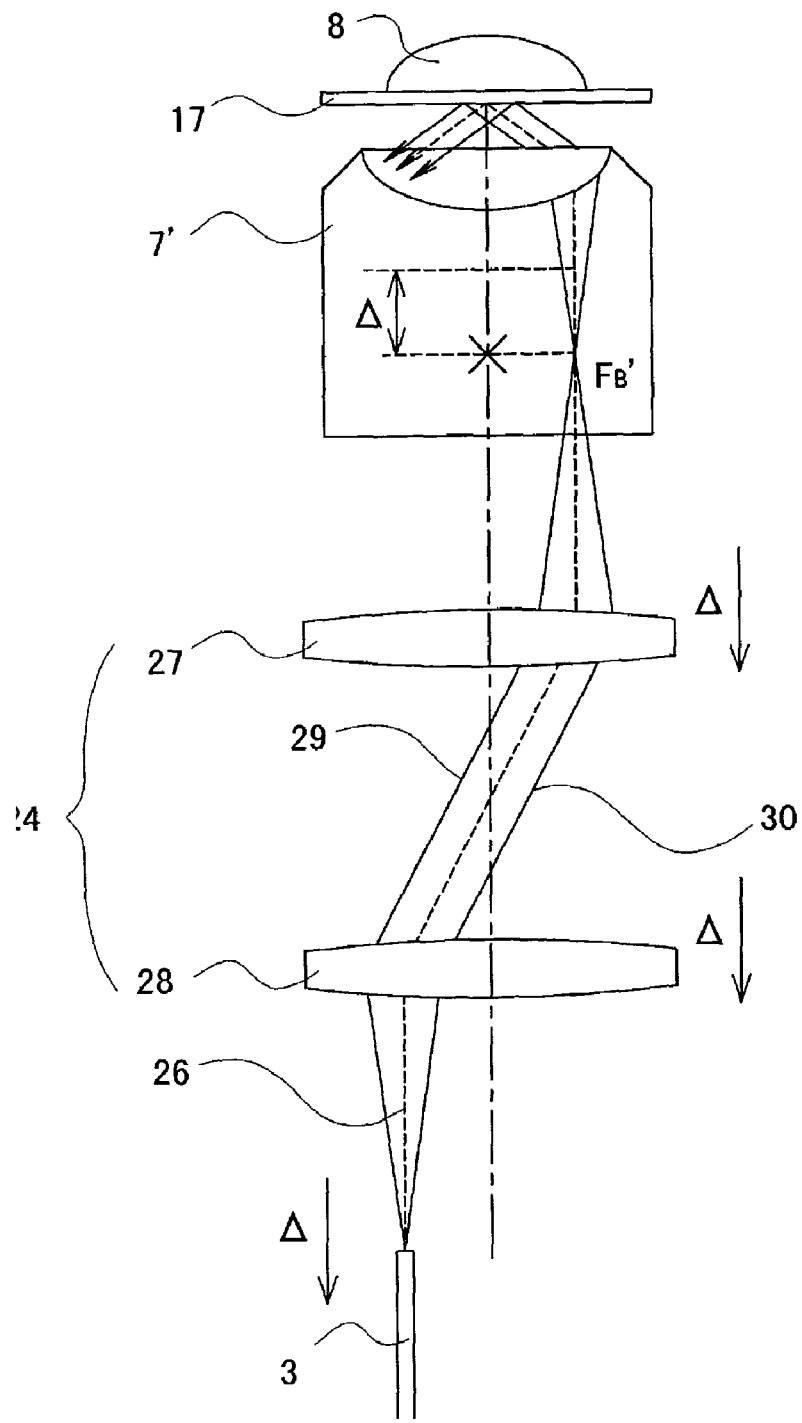
FIG. 10 shows the main section of the illuminating optical system according to the fourth embodiment of the present invention.

The fourth embodiment is shown in FIG. 10. FIG. 10 also shows the main section of the illuminating optical system provided inside the reflecting illumination projecting tube 6. An irradiation optical system 25, which irradiates the sample 8 with laser light emanating from the optical fiber 3, is composed of an objective lens 7' disposed on the sample side and the collecting lens system 24 disposed on the side of the optical fiber 3. In this embodiment also, the dichroic mirror 9 is omitted in the drawing for simplicity, and the optical fiber 3 through the objective lens 7' are illustrated in a linear arrangement.

In this embodiment, a situation where the different lens 7' is used in place of the objective lens 7 of the third embodiment is described. As in the case of FIG. 9, the collecting lens system 24 is composed of two positive lenses 27, 28 and is arranged in such a manner that the back focal point FB of the objective lens 7 and the exit end of the optical fiber 3 are conjugate.

The objective lens 7' has a back focal position FB' different from that of the objective lens 7 of the third embodiment. Therefore, if the objective lens 7' is used instead of the objective lens 7, the back focal position should be displaced by Δmm in reference to the collecting lens system 24. In this case, the chief ray 26 and the marginal rays 29, 30 would not be parallel as emanating from the objective lens 7', and accordingly a part of rays would fail to cause total reflection. As a result, the range (illumination range) D of a beam of rays incident on the interface between the cover glass 17 and the sample 8 does not form a substantial circle and the range required for observation could not be efficiently illuminated.

Therefore, according to this embodiment, a moving mechanism for moving the collecting lens system 24 in a direction of the optical axis is provided so as to move the collecting lens system 24 in a direction of the optical axis in accordance with the change of the back focal position caused by replacement of the objective lens. Whereby, even if back focal positions of objective lenses prepared for use differ, laser light emanating from the optical fiber 3 can always converge on the back focal point.

In addition, the optical fiber 3 also may be moved in the direction of the optical axis in accordance with the movement of the collecting lens system 24. In this case, it is desirable that the optical fiber 3 is moved in such a manner that the exit end face of the optical fiber 3 coincides with the front focal position of the collecting lens system 24.

Also, the lens 27 and the lens 28, which constitute the collecting lens system 24, may be moved not integrally but separately. If individual amounts of movement of the lens 27 and the lens 28 differ, telecentricity of the collecting lens system 24 would be lost. However, if, as in the first embodiment, the lenses 27, 28 or the same lenses with the optical fiber 3 are moved in such a manner that the exit end face of the optical fiber 3 and the back focal position of the objective lens are conjugate, evanescent illumination can be carried out.

In FIG. 10, the individual amounts of movement of the lenses 27, 28 and the optical fiber are indicated with the same symbol Δ. However, as stated above, moving these optical elements by the same amount is not always necessary.

As discussed above, according to this embodiment also, since all of the laser light emanating from the optical fiber 3 are utilized, illumination with high illumination efficiency can be achieved. Also, according to this embodiment, the optical fiber is only required to move in a plane perpendicular to the optical axis. In the movement, the exit end face of the optical fiber 3 need not draw an arc. Therefore, the adjustment mechanism, which adjusts the position of the optical fiber, is allowed to be simpler than in the case of the first or second embodiment, and accordingly the operability is improved.

Fifth Embodiment

Figure 11:
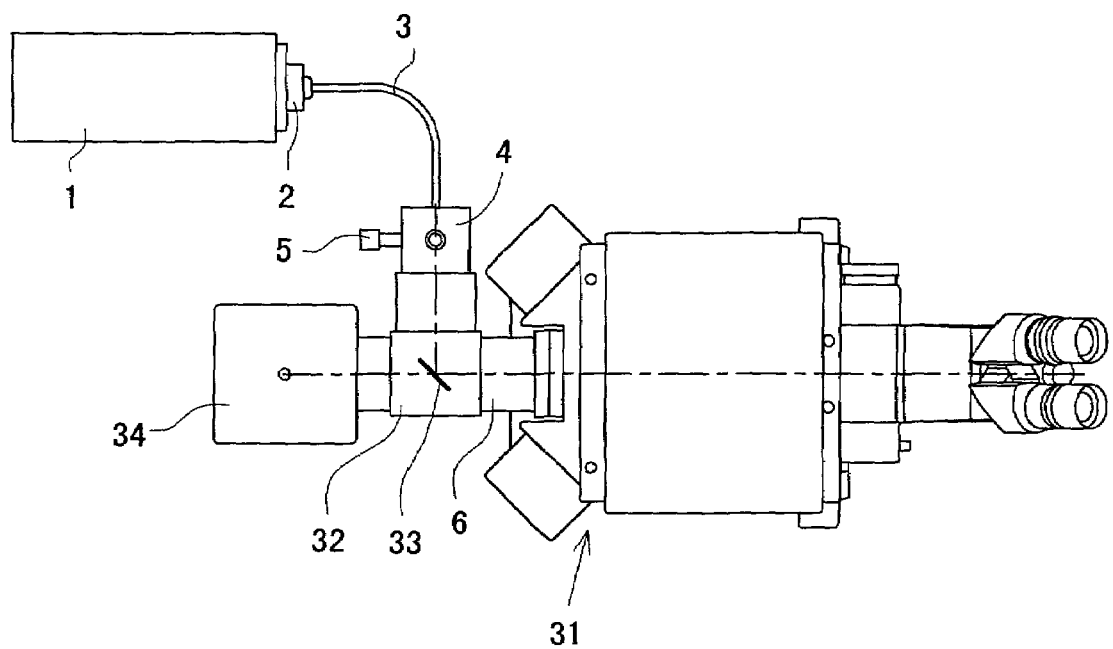
FIG. 11 shows the configuration of the fifth embodiment according to the present invention.

The fifth embodiment is shown in FIG. 11. This embodiment is a modification example of the first embodiment, and the entire system configuration as viewed from the top is illustrated. Regarding the same components as in the first embodiment, the same reference numerals are assigned and explanation is omitted. According to this embodiment, an adapter 32 is coupled to one end of the reflecting illumination projecting tube 6 provided for an inverted microscope 31. The adapter 32 is provided with a light splitting element 33 inside, and has the function of combining beams of rays incident thereon from two directions to be in one path of rays.

Consequently, if the adapter 32 is connected with the adapter 4 of the first embodiment at one entrance end and is connected with a mercury lamp used for reflecting illumination at the other entrance end, evanescent illumination with laser light from the light source 1 and the conventional reflecting illumination with the mercury lamp can be carried out. In this way, illumination method is switchable in accordance with purpose; the conventional reflecting illumination using the mercury lamp would be adopted for observation of a sample containing a plurality of fluorescent dyes or for detection of the sample position, while the evanescent illumination would be adopted for observation of a sample at high sensitivity. Therefore, operability and usability of the apparatus are improved.

According to this embodiment also, the optical system that projects the exit end face of the optical fiber 3 on the back focal position of the objective lens 7 is provided inside the reflecting illumination projecting tube 6. However, in the case where the mercury lamp designed for the conventional illumination is also used as in this embodiment, using a reflecting illumination projecting tube designed for a conventional fluorescence microscope as the reflecting illumination projecting tube 6 sometimes is better in view of keeping the performance level of the conventional reflecting illumination. In this case, it would be better to use the optical system of the conventional reflecting illumination projecting tube or to add another optical system, so that the exit end face of the optical fiber 3 is projected on the back focal position of the objective lens 7.

As the light splitting element 33, there are a mirror, a half mirror, dichroic mirror etc. If a mirror is used as the light splitting element 33, switching between the evanescent illumination and the conventional reflecting illumination is made by insertion and removal of the mirror in and out of the path of rays. In this case, there is no loss of amount of light in either illumination. In the case where a half mirror is used as the light splitting element 33, the apparatus can be made simple because the half mirror need not be moved in and out of the path of rays. However, loss of amount of light occurs. Also, in the case where a dichroic mirror is used as the light splitting element 33, loss of amount of light little occurs.

Also, another set including a light source that emits laser light having a wavelength different from the light source 1, a laser light introducing mechanism, an optical fiber, an adapter, and a fiber position adjustment knob may be provided so as to be attached, in place of the mercury lamp 34, to the adapter 32 via an adapter. In this case, evanescent illumination with a plurality of different wavelengths can be carried out.

Sixth Embodiment

Figure 12:
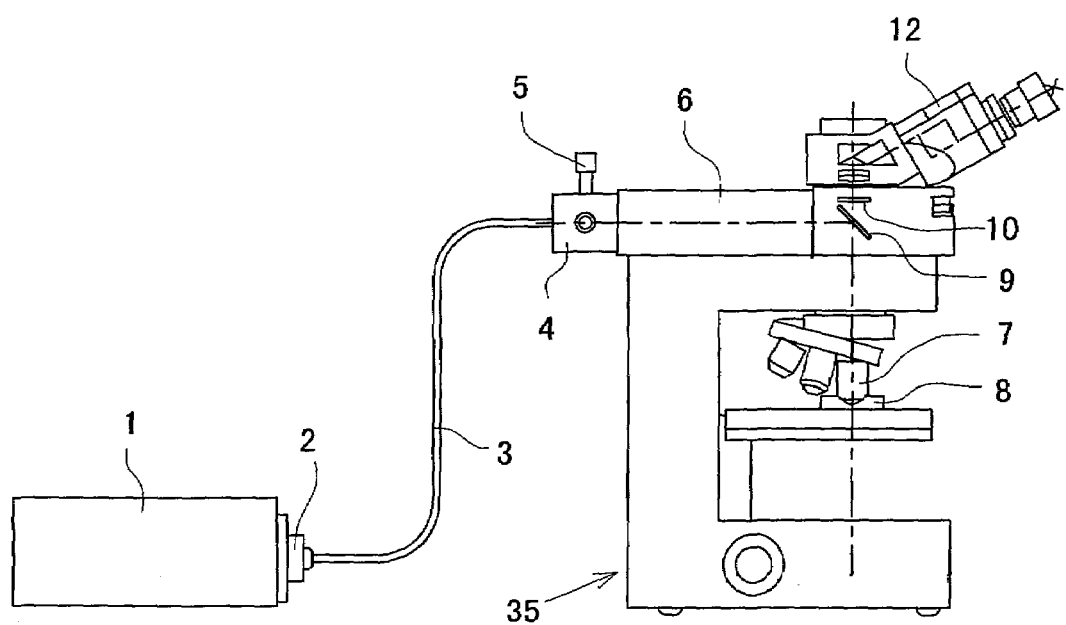
FIG. 12 shows the configuration of an upright fluorescence microscope provided with the illuminating optical system according to the present invention.

The sixth embodiment is shown in FIG. 12. Regarding the same components as in the first embodiment, the same reference numerals are assigned and explanation is omitted. FIG. 12 shows an upright fluorescence microscope provided with the illuminating optical system according to the present invention. In FIG. 12, the reference numeral 1 represents a light source, the reference numeral 2 represents a laser light introducing mechanism, the reference numeral 3 represents an optical fiber, the reference numeral 4 represents an adapter, the reference numeral 5 represents a fiber position adjustment knob, the reference numeral 6 represents a reflecting illumination projecting tube, the reference numeral 7 represents an objective lens, the reference numeral 8 represents a sample, the reference numeral 9 represents a dichroic mirror, the reference numeral 10 represents an absorption filter, the reference numeral 35 represents a microscope body, and the reference numeral 12 represents an observation tube.

According to this embodiment, a single-mode fiber is used as the optical fiber 3. Where a single-mode fiber is used, the size of the exit end face of the optical fiber 3 is small, and accordingly the image of the exit end face of the optical fiber 3 projected on the back focal position of the objective lens 7 also becomes small. In this case, the range of evanescent illumination is extremely small in comparison with the range of the conventional reflecting illumination. However, the projected image of the optical fiber can be moved within the range with certainty and switching from or to the conventional reflecting illumination is easily made.

In addition, not limited to this embodiment, the single-mode fiber may be employed as the optical fiber of the first through fifth embodiments.

As described above, the present invention can provide an illuminating optical system and a microscope that use laser light having a sufficient illumination intensity and that are easily switchable between evanescent illumination and ordinary reflecting illumination, while the entire system is compact.

Also, in a case where a telecentric optical system is used as a part of the illuminating optical system, emanating light from the optical fiber can be efficiently used for evanescent illumination.

Also, in a case where directions of movement of the optical fiber in reference to the optical axis lie in a plane substantially perpendicular thereto, not only the moving mechanism is simplified, but also the operability in switching between evanescent illumination and the ordinary reflecting illumination can be improved.

Also, even if objective lenses having different back focal positions are used, light emanating from the optical fiber can converge on the back focal position of the objective lens or the vicinity thereof, by moving at least a part of the illuminating optical system in the direction of the optical axis.

What is claimed is:

1. A fluorescence microscope that is switchable between Koehler illumination mode and total-reflection fluorescence illumination mode, comprising:
   a laser light source;
   an optical fiber having an entrance end and an exit end for conducting light from the laser light source;
   an irradiating optical system which irradiates a sample with light emanating from the optical fiber, the irradiating optical system comprising a first collecting optical system disposed on a side of the sample and a second collecting optical system disposed on a side of the optical fiber, the second collecting optical system collecting the light emanating from the optical fiber on a back focal point of the first collecting optical system or a vicinity thereof; and
   a light projecting tube that houses the irradiating optical system;
   an adapter section that connects the exit end of the optical fiber with the light projecting tube; and
   a switching mechanism constructed and arranged at the adapter section to switch between the Koehler illumination mode and the total-reflection fluorescence illumination mode, the switching mechanism comprising a moving mechanism which moves the optical fiber in a plane perpendicular to an optical axis of the irradiating optical system to thereby move the exit end of the optical fiber from a first position on the optical axis of the irradiating optical system where the Koehler illumination mode is achieved to a second position separated from the optical axis of the irradiating optical system where the total-reflection fluorescence illumination mode is achieved with total reflection being caused in a vicinity of the sample.

2. A fluorescence microscope according to claim 1, wherein the second collecting optical system is substantially a one-side telecentric optical system.

3. A fluorescence microscope according to claim 2, wherein each of lens components of the second collecting optical system is movable in a direction of the optical axis of the irradiating optical system.

4. A fluorescence microscope according to claim 2, wherein the one-side telecentric optical system is telecentric on a side of the first collecting optical system.

5. A fluorescence microscope according to claim 1, wherein the second collecting optical system is substantially a both-side telecentric optical system.

6. A fluorescence microscope according to claim 5, wherein the second collecting optical system comprises two positive lens components.

7. A fluorescence microscope that is switchable between Koehler illumination mode and total-reflection fluorescence illumination mode, comprising:
   a laser light source;
   an optical fiber having an entrance end and an exit end for conducting light from the laser light source;
   an irradiating optical system which irradiates a sample with light emanating from the optical fiber, the irradiating optical system comprising a first collecting optical system disposed on a side of the sample and a second collecting optical system disposed on a side of the optical fiber, the second collecting optical system collecting the light emanating from the optical fiber on a back focal point of the first collecting optical system or a vicinity thereof,
   a light projecting tube tat houses the irradiating optical system;
   a adapter section that connects the exit end of the optical fiber with the light projecting tube;
   a switching mechanism constructed ad arranged at the adapter section to perform switching between the Koehler illumination mode and the total-reflection fluorescence illumination mode, the switching mechanism comprising a moving mechanism which moves the optical fiber in a plane perpendicular to an optical axis of the irradiating optical system, to thereby move the exit end of the optical fiber from a first position on the optical axis of the irradiating optical system where the Koehler illumination mode is achieved to a second position separated from the optical axis of the irradiating optical system where the total-reflection fluorescence illumination mode is achieved with total reflection being caused in a vicinity of the sample; and
   a knob member arranged between the optical fiber and the irradiating optical system at the adapter section for operating the moving mechanism from outside.

* * * * *